Nov. 14, 1944.   E. W. STEPHENS   2,362,677
CONVEYER SYSTEM
Filed Oct. 30, 1941
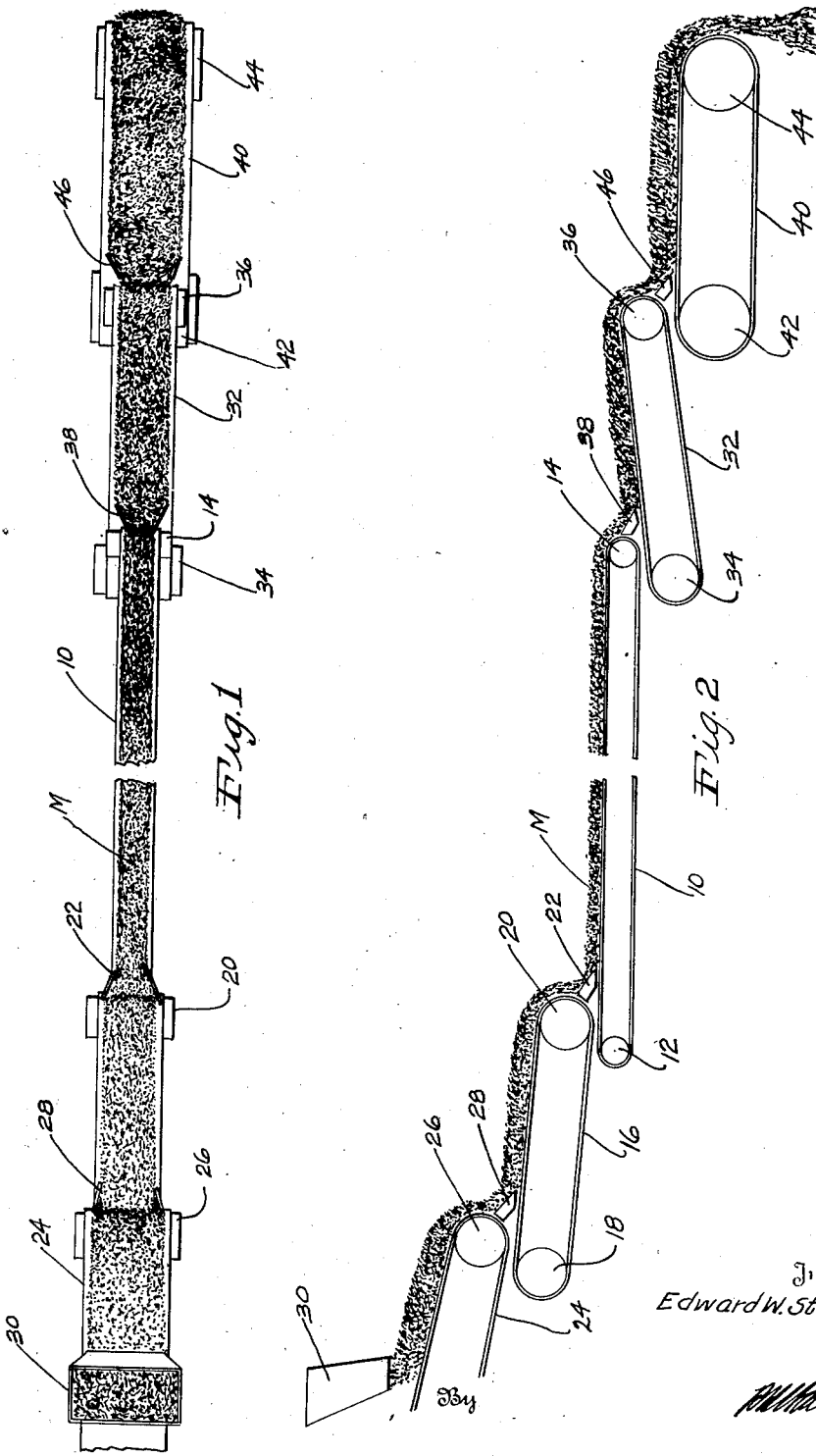
Inventor
Edward W. Stephens
By
Attorney Patented Nov. 14, 1944

2,362,677

UNITED STATES PATENT OFFICE 2,362,677

CONVEYER SYSTEM

Edward W. Stephens, Akron, Ohio, assignor to Wingfoot Corporation, Akron, Ohio, a corporation of Delaware Application October 30, 1941, Serial No. 417,139

2 Claims. (Cl. 198—76)

This invention relates to conveyer systems for transporting coal, stone, gravel, or other material or materials, and, more particularly, is concerned with belt conveyers, such as rubberized fabric belts, adapted to pick up, carry over considerable distance, and deposit loose aggregate or other types of material.

It has been standard practice for many years to convey various material or materials on one or more endless belts carried over head and tail pulleys and having a plurality of rolls for supporting the stretch of the belt or belts and with the belt system being driven by suitable means. However, in the handling of certain relatively fragile materials susceptible to breakage, such as coal, and the like, a very definite problem exists in depositing the material on the conveyer and removing the material from the conveyer without obtaining excessive breakage. This is particularly true if the conveyer is run at other than a slow speed, and a slow speed is usually undesirable because of the considerable time element required to convey the material, and because a wider, more expensive system, belt and equipment, is required for equal tonnage at the slower speed.

It has been proposed heretofore to deposit materials on a pick-up conveyer running at a comparatively slow speed and have the materials from the pick-up conveyer deposited upon a main conveyer of the same width as the pick-up conveyer, but running at a higher rate of speed. However, this type of apparatus is generally employed for the purpose of facilitating the loading of a large amount of material on the main conveyer or for facilitating inspection of the material. Further, it has been suggested heretofore to provide pick-up rolls in conjunction with a movable walk or stairway whereby a person may get on to the main walk or stairway by the pick-up rolls which gradually increase the person's speed to that of the stairway, and other pick-up rolls may be used to receive the person from the movable walk or stairway and gradually decrease the person's speed to place him upon a stationary walk or platform. Likewise, it has been suggested to provide a conveyer system of constant width and having a main portion traveling at one rate of speed and pick-up and discharge portions traveling at slower rates of speed.

It has been thought heretofore that depositing sand or other material upon a fast moving conveyer will cause excessive wear of the conveyer, and pick-up belts traveling at a slower rate of speed have been suggested for use in combination with the loading of a main conveyer belt to avoid excessive wear while loading.

However, in the foregoing, it has been the usual thing to employ main and auxiliary conveyer belts of the same or substantially the same width and this has added greatly to the cost of a conveyer installation, particularly where the conveyer is relatively long, as for example, in a conveyer conducting materials cross country. Further, I have found that excessive wear ordinarily does not occur on the main conveyer belt and this lack of wear is due, I believe, to the infrequency with which each part of the belt passes the loading station. Further, and of greatest importance, I have found that heretofore no conveyer system has been provided which fully utilizes, extends, and completes the partial teachings of the prior are to provide for the first time a uniformly loaded conveyer system.

It is the general object of my invention to avoid and overcome the foregoing and other difficulties of and objections to prior art practices, and to combine and fully utilize for the first time the fragmentary, partial and incomplete teachings of the prior art by providing an improved conveyer system having a maximum of speed, a minimum of cost, and a comparatively gentle handling of the material or materials conveyed.

Another object of my invention is the provision of a conveyer system having a relatively narrow main conveyer belt traveling at a comparatively high rate of speed, in combination with a plurality of accelerating and decelerating conveyer belts positioned at the loading and unloading ends of the main conveyer belt and of progressively greater width and driven at progressively lesser speeds than the main conveyer belt for facilitating the loading and unloading of the main conveyer belt.

Another object of my invention is to provide a conveyor system made up of a plurality of individual conveyers traveling at different rates of speed but wherein each conveyer is of such a width that when fully loaded it will carry the same amount of material past any given point in the same time interval as every other conveyer in the system.

Another object of my invention is to provide a conveyer system wherein the material is received from a hopper or other loading means upon a relatively wide slow traveling conveyer belt which deposits the material upon a narrower conveyer belt traveling at a higher rate of speed which in turn deposits the material upon a relatively narrow main conveyer belt traveling at a very high rate of speed, with the material being received at the discharge end of the main conveyer belt upon a wider conveyer belt traveling at a slower rate of speed which in turn deposits the material upon a relatively wide conveyer belt traveling at a comparatively slow rate of speed which in turn deposits the material at the discharge station.

The foregoing and other objects of my invention are achieved by the provision of a conveyer system wherein the speed and width of the main conveyer required for any given job is first determined and then auxiliary conveyers driven at slower speeds than the main conveyer are co-ordinated therewith so that the same amount of material is conveyed by all of the conveyers in the system and each conveyer is fully loaded.

In the accompanying drawing Fig. 1 is a diagrammatic plan view of a typical conveyer system embodying the principles of my invention; and Fig. 2 is a side elevation of the conveyer system shown in Fig. 1.

Although the principles of my invention may broadly be applied to any type of conveyer system, they are primarily adapted to a conveyer system employing wide troughed endless belts, as for example, belts of rubberized fabric material, and, accordingly, the invention has been illustrated in conjunction with wide troughed endless belts and will be so described. In the drawing, the numeral 10 indicates diagrammatically a relatively narrow endless conveyer belt supported on head and tail pulleys 14 and 12 and having the upper reach of the conveyer belt carried by suitable supporting rollers (not shown). The conveyer belt 10 extends ordinarily a considerable distance, as for example, cross country, and is driven by suitable means (not shown) at a relatively high rate of speed. For example, the conveyer belt 10 may be driven at a speed of 900 feet per minute and may be approximately 36 inches in width.

Material, shown at M, is deposited upon the main conveyer 10 by a conveyer belt 16 supported between head and tail pulleys 20 and 18. The conveyer belt 16 is comparatively short and is wider than the belt 10 and is driven at a slower rate of speed than the belt 10. Specifically, the belt 16 may be approximately 42 inches wide and driven at a speed of approximately 620 feet per minute. The discharge end of the conveyer 16 is positioned above the loading end of the conveyer 10 and in longitudinal alignment therewith so that the material M moving from the conveyer 16 will be deposited upon the belt 10. The head pulley 20 on the conveyer 16 may be made of a small diameter so that the fall of the material from the conveyer 16 to the conveyer 10 will be relatively short and breakage of the material will be avoided. Moreover, I preferably employ a chute 22 between the conveyers 16 and 10 so that the materials discharged from the conveyer 16 will slide down the chute 22 and be deposited on the conveyer 10 without breakage.

The material M is deposited on the conveyer 16 by a conveyer 24 which extends around the head pulley 26 with this pulley being used in conjunction with a chute 28 so that breakage of material M in the transfer from the conveyer 24 to the conveyer 16 is largely eliminated. The conveyer 24 travels at a slower rate of speed and is relatively wider than the conveyer 16. For example, the conveyer 24 may be approximately 54 inches in width and may travel at a speed of about 350 feet per minute. The material M is deposited upon the conveyer 24 in any suitable manner, as for example, from a feeding means 30.

At the discharge end of the main conveyer 10 the material may be deposited upon a conveyer 32 carried over a tail pulley 34 and a head pulley 36. The conveyer 32 is wider than the main conveyer 10 and is driven at a slower rate of speed. Specifically, the conveyer 32 may be approximately 42 inches in width and may be driven at a speed of about 620 feet per minute. A chute 38 is usually provided to receive the material M from the main conveyer 10 and to deposit the material on the conveyer 32 without breakage.

From the conveyer 32 the material M may be deposited upon a conveyer 40 which extends over a tail pulley 42 and a head pulley 44 and which is of greater width and driven at a slower speed than the conveyer 32. Particularly, the conveyer 40 may be approximately 54 inches in width, and may be driven at a speed of about 350 feet per minute. A chute 46 is preferably positioned between the tail pulley 36 of the conveyer 32 and the conveyer 40 so that material discharged from the conveyer 32 onto the conveyer 40 will not be subject to breakage. A chute may be employed to receive the material from the conveyer 40 and to deposit the material on a pile or on other suitable discharge means at the discharge station.

From the foregoing it will be evident that the general principle of my invention is to provide in a conveyer system having a plurality of conveyers of different widths and driven at different speeds a correlation of width to speed so that the long, cross-country conveyer or conveyers may have the benefit of the highest practicable speed and consequent narrower width, thus, to keep at a minimum the investment required for the main line conveyer. Heretofore those skilled in the art have been inhibited from running the main conveyer system at other than conventional speed, because of the difficulty and penalty (wear) attached to the introduction of slow moving material, or material at rest to a fast moving belt. Those skilled in the art have been similarly inhibited because of the difficulty and penalty (degradation of material) attached to discharging material at high speed. From the standpoint of investment it is extremely desirable to operate the main-line, cross-country conveyer at higher than conventional speed. My proposal of specific accelerating and decelerating conveyers used in conjunction with the main line system permits this action. Thus a transport system which is impracticable without such aid becomes practical when such means are employed.

In illustration, it is desired to transport 1,000 tons per hour of coal a distance of two miles. Conventional practice would dictate a handling speed, to avoid breakage, of, say, 400 F. P. M. A 54 inch wide belt at 350 F. P. M. would yield the desired capacity and on the conservative side of safe speed. The 54 inch belt, supported on 54 inch equipment, projected over the two miles, would necessitate a capital investment sufficiently large to threaten the practicability of the conveyer system, as measured by the cost of other transport means.

Now, and as heretofore described, by using a 54 inch belt at 350 F. P. M. as a primary accelerating belt to receive the coal from a hopper or mechanical feeder, and having this belt dump onto a 42 inch belt traveling at 620 F. P. M. equal volumetric capacity with the 54 inch belt traveling at 350 F. P. M. is achieved. The 42 inch belt dumps onto the 36 inch belt traveling at 900 F. P. M. and this likewise achieves equal volumetric capacity. The lengths of the accelerating 54 and 42 inch belts would be relatively short, not over 100 feet centers, each. At the discharge end the reverse procedure is followed i. e. the 36 inch belt traveling at 900 F. P. M. dumps onto the 42 inch belt traveling at 620 F. P. M. which, in turn, dumps onto the 54 inch belt traveling at 350 F. P. M. The decelerating belts are also relatively short. Thus the main-haul, cross-country is negotiated on a 36 inch belt system and yet relative speeds from one belt to the next, or from rest to start, or at discharge are all at or below conventional. The relative speed from one belt to the next on the main line is zero, (the main line of the conveyor is usually made up of a plurality of belts traveling at the same speed). The initial, accelerating speed from rest is a conventional 350 F. P. M. The relative speed between primary and secondary accelerating units is 620 minus 350 equals 270 F. P. M. Similar speed differences exist at the discharge end.

It will be appreciated that the main conveyor 10 is made as narrow as possible so that when traveling at its maximum rate of speed it will deliver the desired quantity or weight of material during a given time interval. The main conveyer belt is made as narrow as possible so that the cost thereof is kept at a minimum, particularly in view of the fact that the main conveyer is often relatively long, and may even extend miles, in which case the main conveyer actually is made up of a plurality of main conveyers all of the same width and driven at the same speed. The auxiliary conveyors 16, 24, 32 and 40 are made of a minimum width to convey an amount of material equal to the amount of material conveyed by the main conveyor. Also, the accelerating conveyers 16 and 24 are driven at lineal speeds which will enable the material to be picked up from a stationary position, periodically advanced in speed, and deposited on the main conveyer all without breakage or undesirable segregation of the material. The decelerating conveyers 32 and 40 bring the material gradually to rest, again without breakage, as will be understood. Obviously, the exact number of auxiliary belts, their speeds and the speed of the main belt 10 may be widely varied to meet any installation requirement or condition. Specifically, I may drive the accelerating conveyors 16 and 24 at speeds of 700 and 500 feet per minute, respectively, if the feeding means 30 associated with the conveyor 24 is adapted to place the material M on the conveyor at sufficient speed to eliminate breakage or segregation. If this is done the widths of the belts are determined in accordance with the conventional rule.

From the foregoing, it will be recognized that the various objects of my invention have been achieved by the provision of a conveyer system adapted to convey a maximum of material and at a minimum of cost over any desired, and even long distances, with maintenance, material breakage, belt wear, and the like being reduced to a minimum.

While in accordance with the patent statutes I have particularly illustrated and described one embodiment of my invention, it should be definitely understood that I am not to be limited thereto or thereby, but the scope of my invention is defined in the appended claims.

I claim:

1. A conveyer system including a long narrow main conveyer and belt adapted to extend a considerable distance cross-country, said conveyer belt being less than about three feet wide, a series of short auxiliary conveyer belts of progressively narrower width but all of greater width than the main conveyer belt for depositing material on the main conveyer belt, a series of short auxiliary conveyer belts of progressively greater width than the main conveyer belt for receiving material from the main conveyer belt, means for driving said main conveyer belt at a speed of over about eight hundred feet per minute, and means for driving each of said other conveyer belts at a speed which corresponds to the speed of the main conveyer belt, substantially inversely as the square of the width of said other belt corresponds with the square of the width of the main conveyer belt.

2. A conveyer system including a long narrow main conveyer and belt adapted to extend a considerable distance cross-country, a series of short auxiliary conveyer belts of progressively narrower width but all of greater width than the main conveyer belt for depositing material on the main conveyer belt, a series of short auxiliary conveyer belts of progressively greater width than the main conveyer belt for receiving material from the main conveyer belt, means for driving said main conveyer belt at a high rate of speed, and means for driving each of said other conveyer belts at a speed which corresponds to the speed of the main conveyer belt, substantially inversely as the square of the width of said other belt corresponds with the square of the width of the main conveyer belt.

EDWARD W. STEPHENS.